June 23, 1931.    J. L. MEEHAN    1,811,758
AMUSEMENT DEVICE
Filed Oct. 26, 1929    7 Sheets-Sheet 1
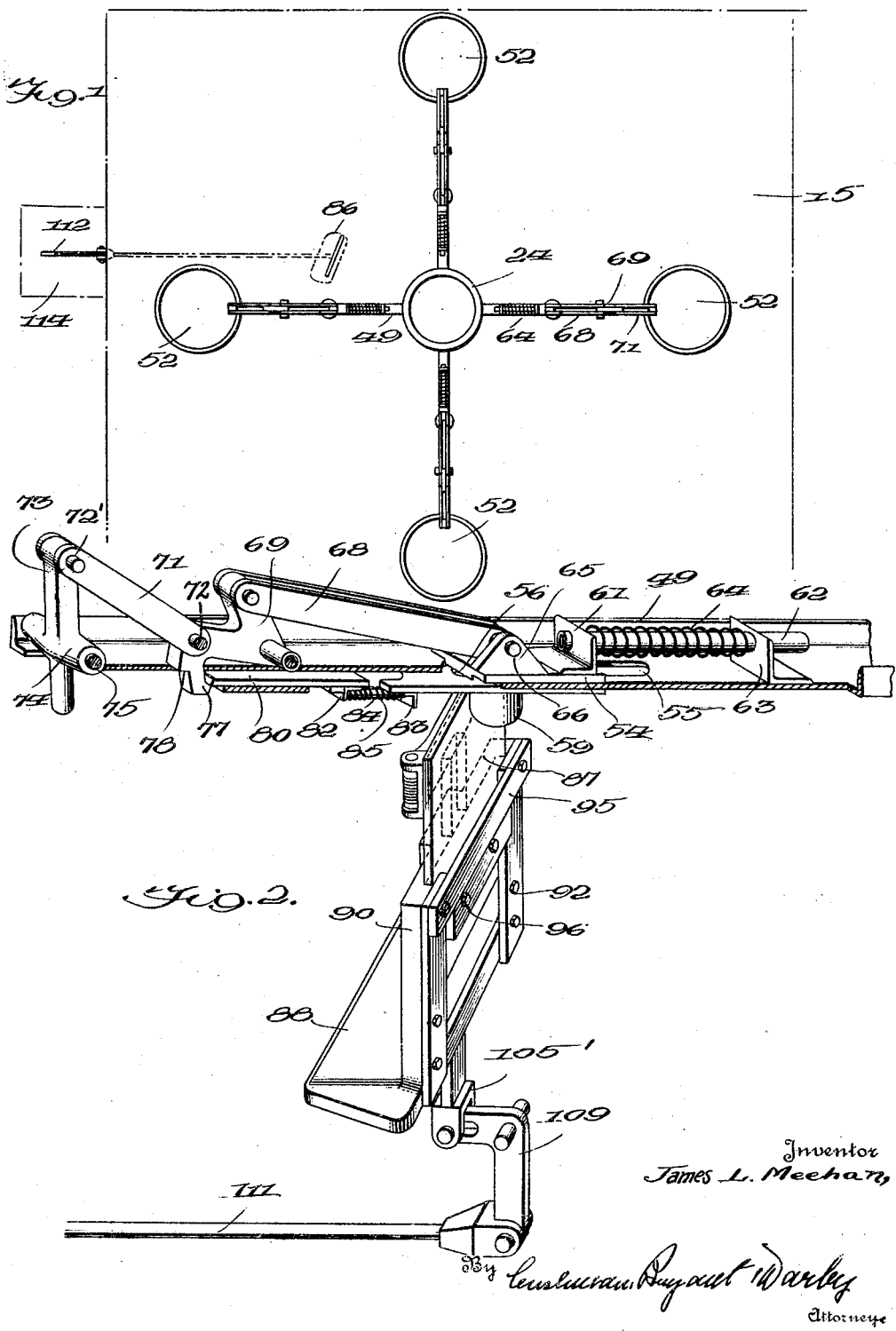
Inventor
James L. Meehan,

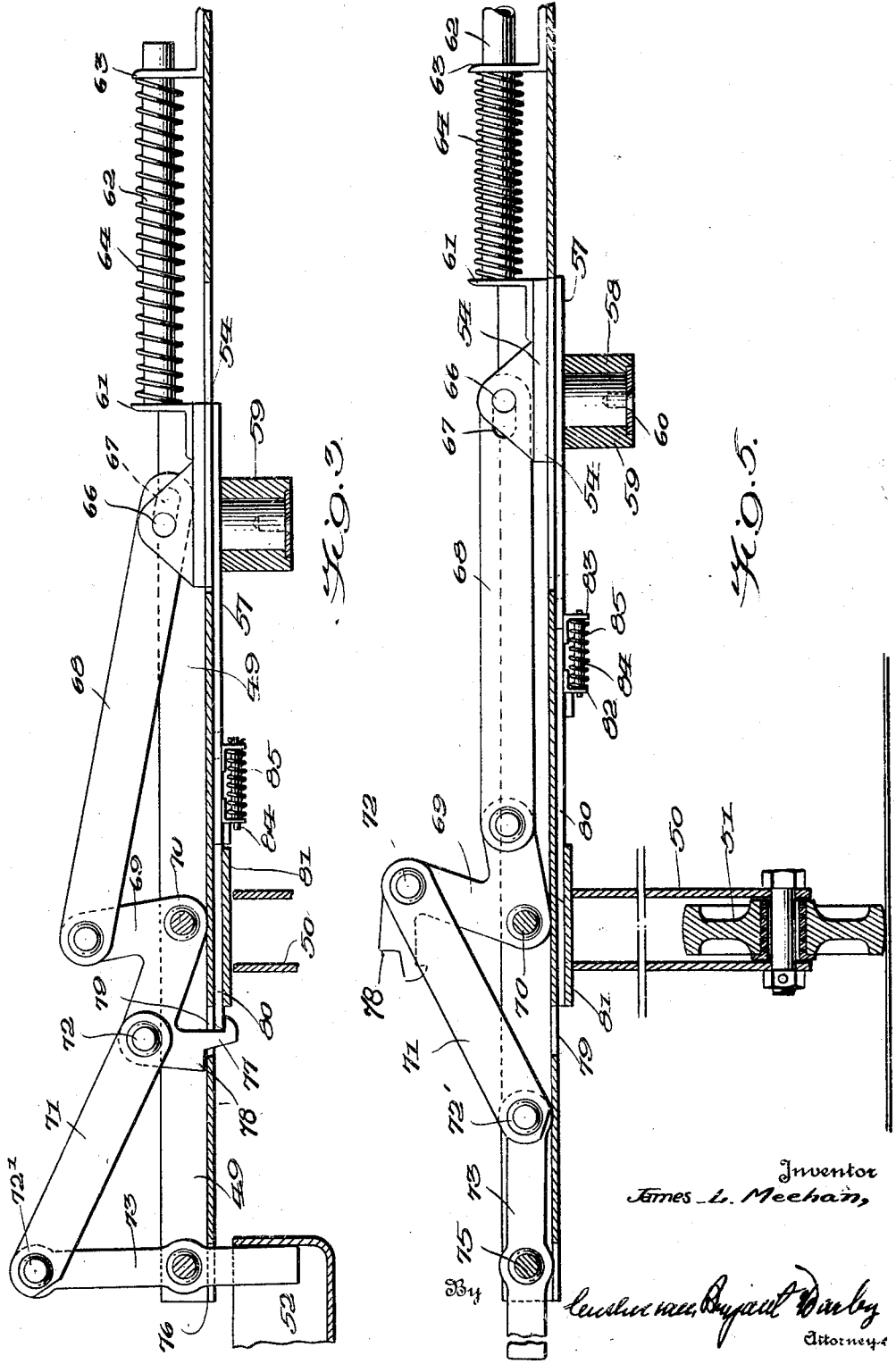

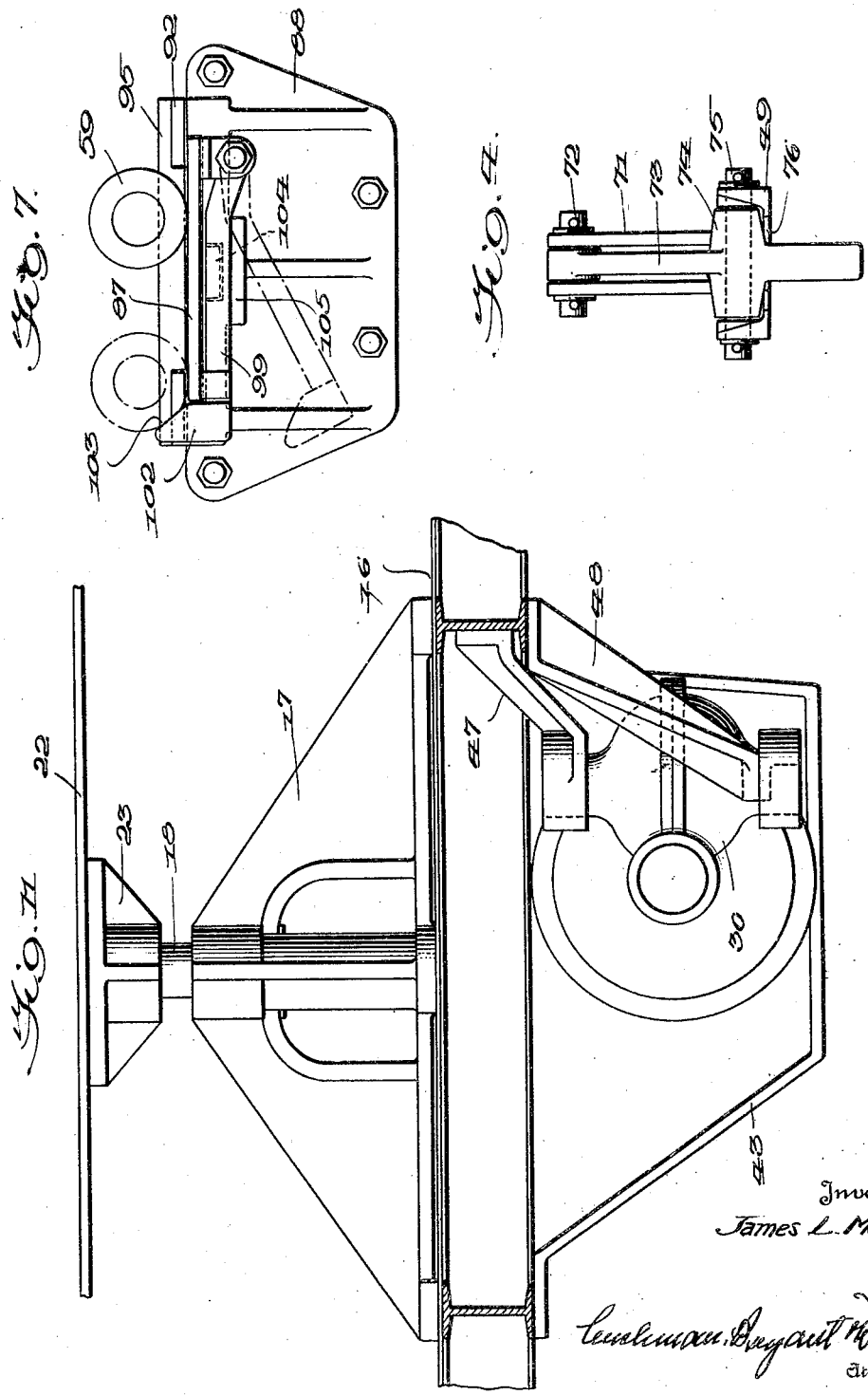

June 23, 1931. J. L. MEEHAN 1,811,758
AMUSEMENT DEVICE
Filed Oct. 26, 1929  7 Sheets-Sheet 4
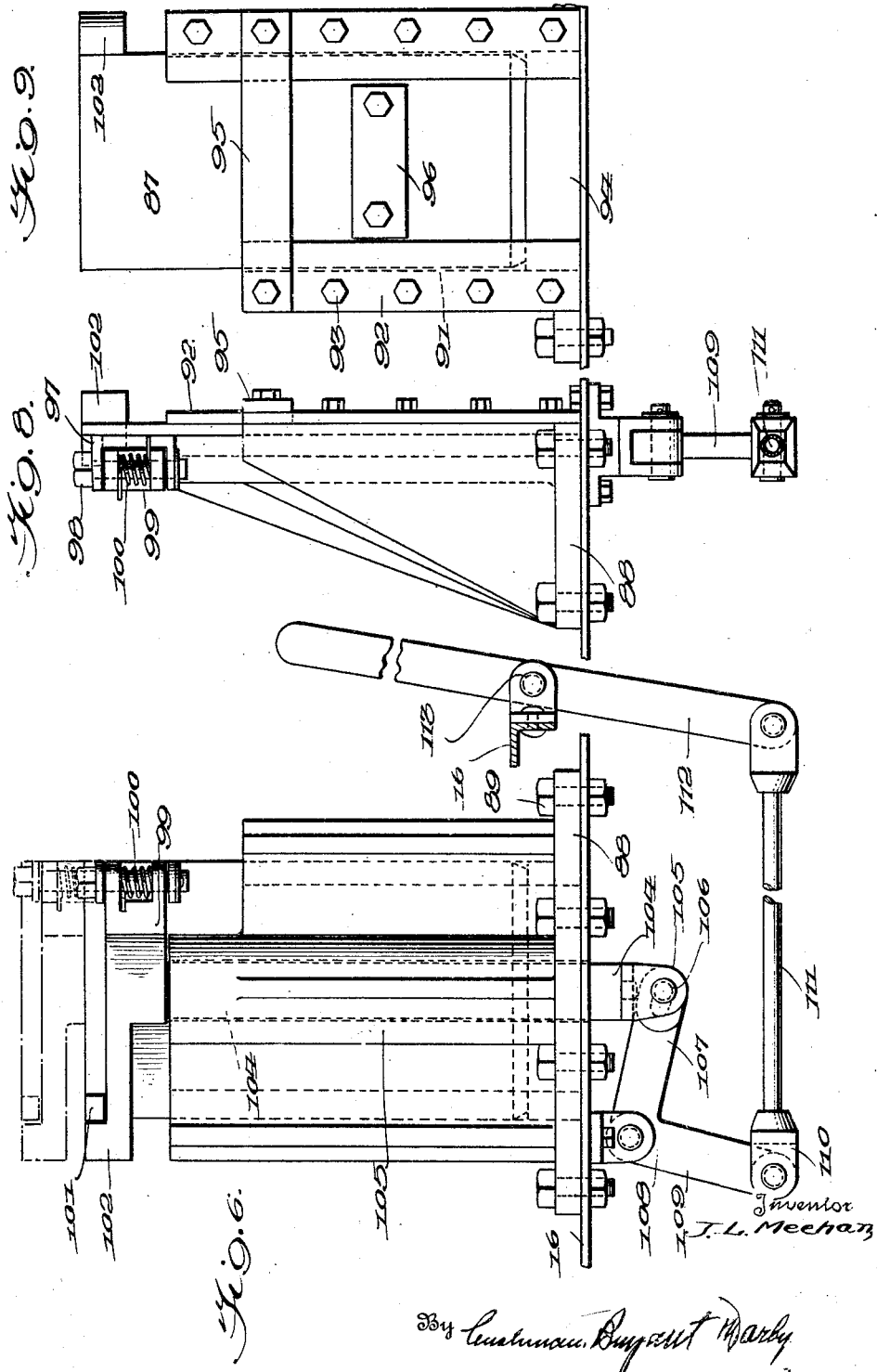

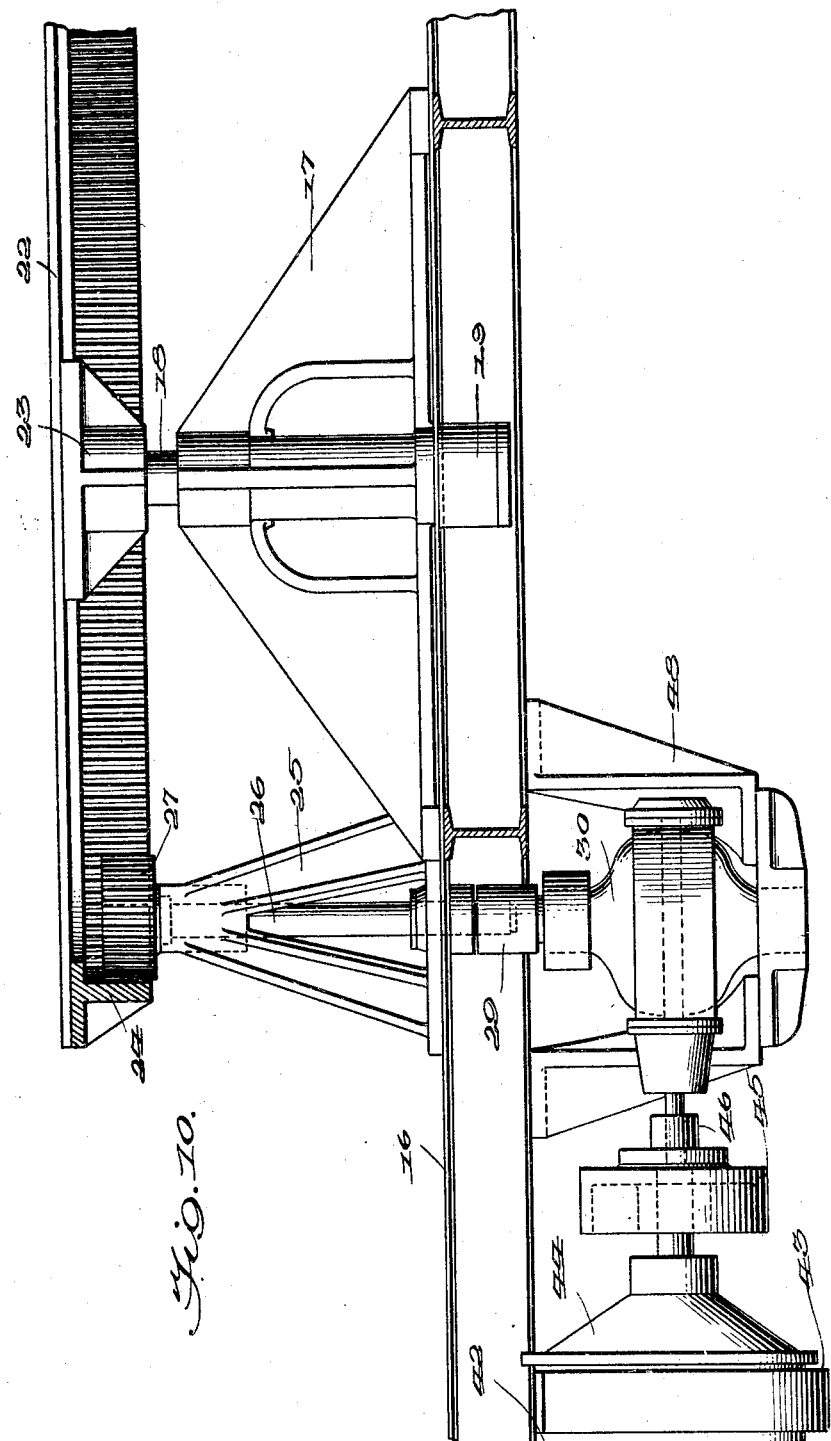

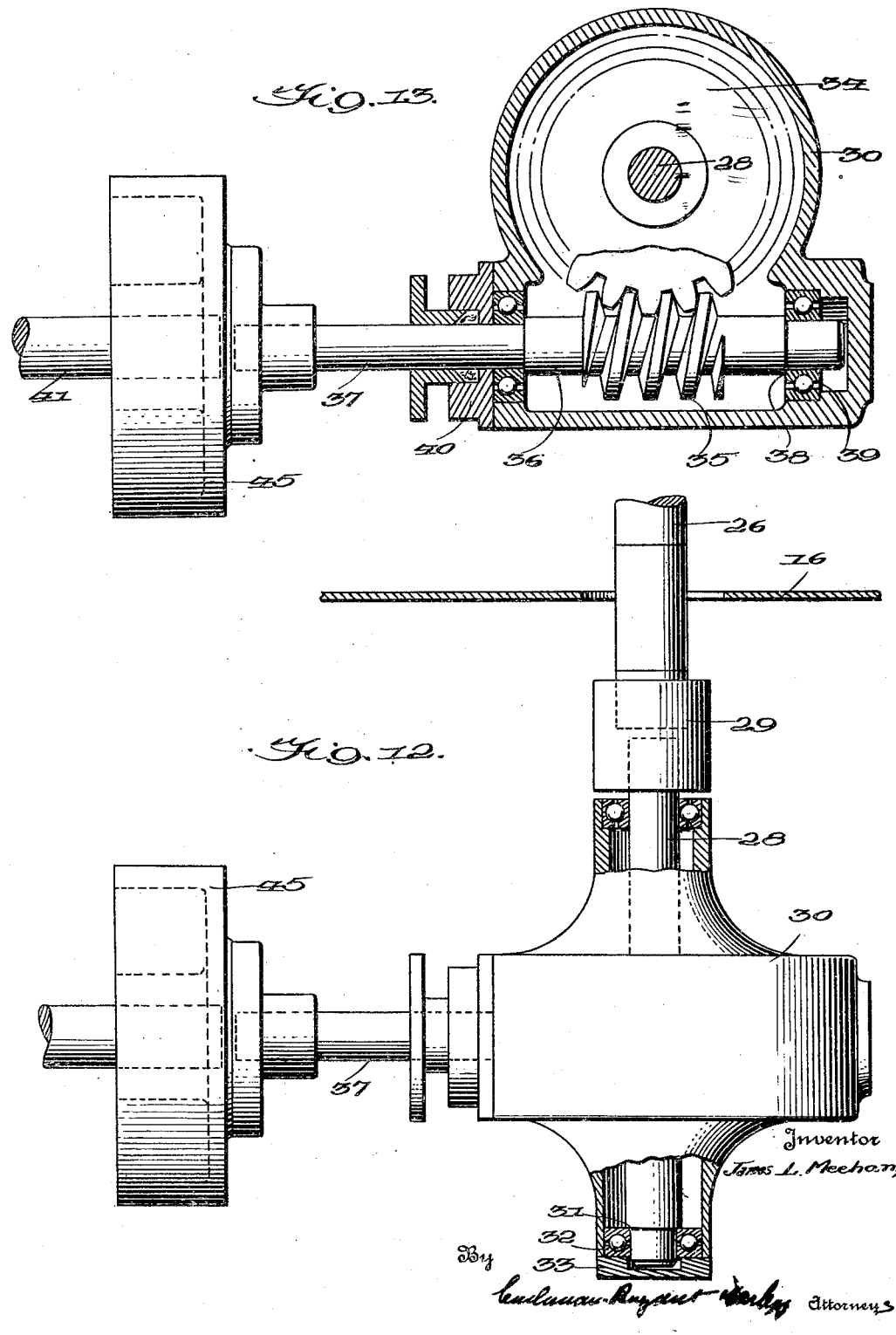

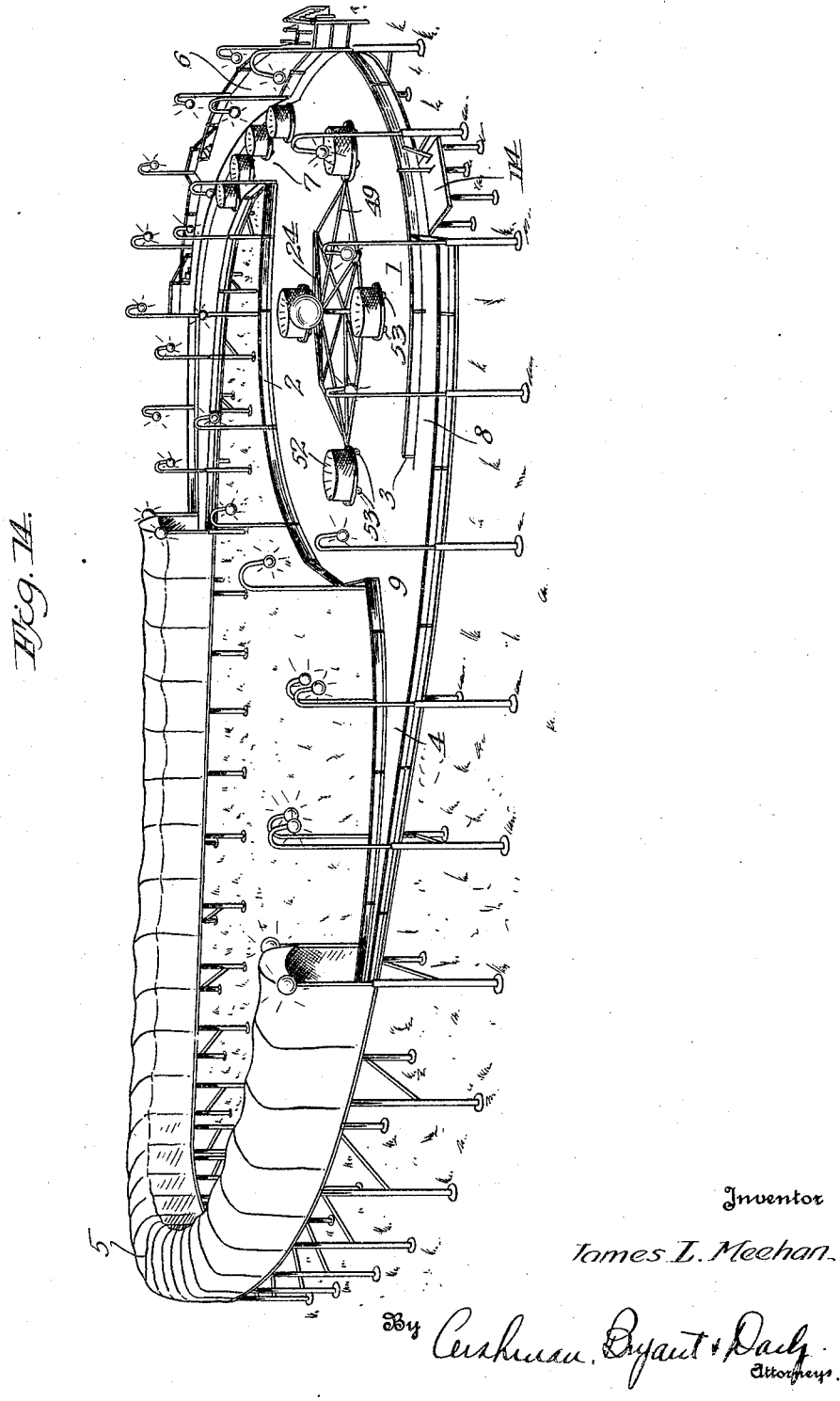

Patented June 23, 1931

1,811,758

UNITED STATES PATENT OFFICE

JAMES L. MEEHAN, OF ASHLAND, KENTUCKY

AMUSEMENT DEVICE

Application filed October 26, 1929. Serial No. 402,750.

This invention relates to new and useful improvements in amusement devices.

An important object of the invention is to provide an apparatus which will give new thrills to frolickers at amusement parks, and consists, broadly, of a plurality of passenger carrying vehicles which are driven in an endless or circular path, and thereafter released and thrown outwardly by centrifugal force so as to be freely movable in every direction under their own momentum over the floor space.

Another important object of the invention is to provide an amusement device consisting broadly of a revolving head having a plurality of radiating car propelling arms to which the passenger vehicles are temporarily coupled, to be moved in an endless or circular path, and a remotely controlled release mechanism operable at the will of an operator to cause the vehicles to become uncoupled from the propelling mechanism and permitted to roll in every direction over the floor space under the influence of their own momentum and the centrifugal force imparted to them by the revolution of the radiating arms.

Another object of the invention is to provide a novel drive mechanism for the device, having a brake mechanism associated in such relationship with other parts of the drive mechanism that the revolving arms can be positively stopped at the desired moment, and the torque set up in the revolving head will be absorbed by the drive mechanism.

Other objects and advantages of the invention will become apparent during the course of the following description.

In the accompanying drawings forming a part of the description, and wherein like numerals are employed to designate similar parts throughout the several views, Figure 1 is a diagrammatic top plan of the device, Figure 2 is an enlarged perspective view of one of the vehicles propelling arms, with parts thereon broken away for a clearer illustration, and shown in association with the vehicle releasing mechanism, Figure 3 is an enlarged longitudinal section of one of the vehicle propelling arms illustrating the edge of a vehicle coupled therewith, Figure 4 is an end elevation of the free end of the car propelling arm, Figure 5 is an enlarged longitudinal section of the propelling arm shown in Figure 3 with the latch or lock shown in released position to free a vehicle therefrom, Figure 6 is an enlarged elevation of the latch releasing mechanism, Figure 7 is a top plan of the same, Figure 8 is a side elevation of the latch releasing mechanism, Figure 9 is a rear elevation of the same, Figure 10 is an enlarged side elevation of the drive mechanism, with parts shown in section, Figure 11 is an end elevation of the same, Figure 12 is an enlarged side elevation of the drive mechanism, Figure 13 is an enlarged top plan of the same, with parts thereof shown in horizontal section, and Figure 14 is a perspective view of one form of the amusement device.

Referring now more particularly to the drawings, a floor space 15 of any desired shape is provided, but in the present illustration of the invention is shown as a slightly elevated circular arena or platform 16. This floor space or platform may be of any desired outline, and may be perfectly smooth and flat, with suitable barriers around the same to restrict the movement of the vehicles, or may have any suitable undulations therein to give the vehicles a rocking movement, or may be perfectly horizontal and smooth in a circular path about which the vehicles are propelled by the revolvable drive head and perfectly flat and horizontal out to its boundaries, or the boundaries of the floor space or platform may be inclined so as to cause the vehicles to move back into the paths of the other vehicles, after having been released from the revolvable head and have rebounded from the barriers defining boundaries of the floor space or platform; but in the present illustration is shown as a perfectly flat smooth, horizontal, elevated platform or floor 16. This platform or floor space may be of any desired outline, with confining walls around the edge, and may be perfectly smooth and flat, as shown, or it may be undulated, or the boundaries of the floor space may be inclined to cause the vehicles to return toward the center of the platform.

In Figure 14, this platform 16 is shown as a substantially circular arena 1, with a perfectly flat floor space and circular confining walls 2. This confining wall has a portion thereof removed to provide an exit passageway 3 leading into a guideway 4, which inclines upwardly from the passageway 3, makes a turn 5, and then inclines downwardly to return vehicles projected from a revolvable head or projector 24 located at the center of the arena, back to a passenger loading station 6, which communicates with the arena 1 through an inlet passage 7 at a point substantially diametrically opposite the passageway 3. Concentric with the arena is a blind alley or guideway 8 extending partially around the arena and located just outside of the same with its inlet mouth arranged at the juncture of the guideway 4 and the arena. The floor of the guideway 4 adjacent the exit 3 may be slightly inclined downwardly and outwardly, as at 9, so as to guide any vehicles 52 which do not make the up-grade in the passageway 4 into the blind guideway 8, so that they will be caused to move by gravity into the blind guideway and out of the path of other vehicles 52 projected by the rotary projector 24 and to prevent the vehicles which do not make the grade from moving backwardly into the arena 1. The end of this blind guideway 8 opposite its mouth is closed, as shown, and its sides are provided with confining walls; the inner of which constitutes a continuation of the circular confining wall of the arena.

It is to be noted that when the vehicles 52 are releasably coupled with the rotary projector 24, that there is sufficient space between these coupled vehicles and the circular confining wall 2, to permit the passage of free vehicles without contacting with either the coupled vehicles or the arena wall.

A stand 17 is bolted to the center of the platform 16 to extend upwardly therefrom in forming a bearing for a vertical shaft 18, the lower end of which is supported in a thrust bearing 19 suspended beneath the platform. This vertical shaft extends a distance above the platform, and there has a revolvable head or ring 22 secured thereto by means of a half coupling 23. The revolvable head in the present illustration is shown as being constructed of channel iron of substantially T-shape in cross section, the depending flange 24 of which has an internal gear formed or otherwise provided upon its inner periphery, as best shown in Figure 10.

Mounted in the bearings of the pinion shaft stand 25 is a vertical pinion shaft 26 having its upper end extended above the stand and keyed to a pinion 27 adapted to mesh with the internal gear of the revolvable head for revolving the same. This shaft 26 extends down through the platform 16, and is connected to a vertical differential shaft 28 through the medium of a flexible coupling 29. This differential shaft 28 is mounted in roller bearings placed in opposite ends or extensions of a differential housing 30, it being observed in Figure 12 that the lower end of the shaft is provided with a thrust shoulder 31 engaging the upper race of the ball bearing 32 supported by thrust cap 33 secured to the lower extension of the housing.

As shown in Figure 13, a worm wheel 34 is keyed to the differential shaft 28 and meshes with a worm 35 formed on the enlarged portion 36 of a countershaft 37. This enlarged portion 36 of the shaft forms thrust shoulders 38 at opposite ends thereof for engagement with the ball races 39 mounted in the differential housing to support the countershaft in a horizontal plane. A stuffing box 40 encircles the projecting end of the countershaft in order to seal the same against the loss of lubricant contained in the differential housing 30. In axial alignment with the countershaft is the power shaft 41 of the prime mover 42, shown best in Figure 10, which is suspended under the platform by means of the straps 43, or in any other suitable manner. A clutch 44 encircles the power shaft adjacent the prime mover, and a brake drum 45 is secured to the power shaft adjacent its end, which is arranged in close proximity to the countershaft 37. A half coupling 46 is keyed upon the end of the countershaft and is bolted to the brake drum 45, and any suitable brake band, not shown, and remote control, operated from the operator's platform at the edge of the platform 16, may be provided for tightening the brake band and stopping the revolvable head at any desired point.

The differential housing 30 is supported beneath the platform by a pair of brackets 47 and 48 bolted to the frame of the platform and encircling the oppositely extending necks or extensions of the housing, as best seen in Figure 11. From the foregoing it will be apparent that the revolvable head 24 may be revolved at any desired speed from the prime mover 42, and that instantaneous stoppage of the revolution of the head may be effected, due to location of the brake drum in the line of power transmitting devices from the prime mover, and that torque developed in the revolving head and pinion shaft 26 will be absorbed by the flexible coupling 29, differential shaft 28, differential worm gearing, and coupling 46.

Referring now to Figure 1, it will be noted that the revolvable head just described is designated by the numeral 24, and secured thereto are a plurality of radiating arms 49, preferably of U-shaped channel construction as clearly indicated in Figures 2 and 4. Any number of these arms may be secured to the revolvable head, to be revolved in a horizontal plane substantially above the platform 16.

As all of these vehicle propelling and projecting arms 49 are of identically the same construction, a description of one will suffice for all.

These arms are all elongated, and in order to support the weight at the outer ends, each arm is provided, as shown in Figure 5, with a depending bracket or fork 50 for the mounting of the floor engaging wheel or roller 51 mounted upon a horizontal axis in the lower end of the bracket, as shown. As stated hereinbefore, a vehicle 52 is adapted to be detachably coupled to the outer end of each arm 49, whereby the vehicle is whirled around in a circular path prior to its being released from its respective arm to travel over the floor space under its own momentum. The vehicles 52 are all of like construction, and are provided with any suitable means whereby they can be freely moved over the floor space, but, preferably, these vehicles are mounted upon a plurality of casters 53, whereby they may move in every direction over the floor space when released from the revolvable projector head 24. A latching or locking device is provided for each arm 49 to releasably couple the vehicles to the ends of the arm, and includes a slide 54 movable longitudinally of the arm 49 in a longitudinally extending slot 55, the ends of which serve as abutments for limiting the movement of the slide in both directions. The slide 54 has a reduced depending rib 56 on its underside adapted to travel in the slot 55, and to the underside of the rib 56 is bolted, or otherwise secured, a plate 57, from the bottom of which depends a pin 58, upon which a roller 59 is removably secured by the cap plate 60, as best seen in Figures 3 and 5. Secured to the upper face of the slide 54 is an angle cleat 61 having a horizontally extending bolt 62 extending longitudinally in the channel of the arm 49 toward a revolvable head 24. The free end of the bolt 62 is slidably mounted in a cleat 63 secured to the arm 49, and a compression spring 64 is carried by the bolt between the two cleats 61 and 62, so that upon movement of the slide 54 inwardly toward the revolvable head, the spring 64 will be compressed to store power.

Rising from the slide 54 are a pair of apertured ears 65 receiving a transverse pivot pin 66 which extends through elongated slots 67 in the inner ends of connecting link 68 for pivotally and slidably connecting these links to the slide. These connecting links 68 are held in spaced parallel relationship by a suitable spacing collar on the pin 66, and their forward ends are connected to the shorter arm of a bell crank catch 69, the knee of which is fulcrumed upon the pivot pin 70 extending through the upstanding flanges of the arm 49. To the longer arm of the bell crank catch 69 are pivotally connected, as at 72, a second pair of spaced parallel connecting links 71, the other ends of which are pivotally connected by a pin 72' to the upper end of a latch member 73. It will be noted that the pivot 72 is arranged a greater distance from the fulcrum 70 than the pivot pin connecting links 68 with the bell crank, and that the longer arm of this bell crank and links 71 constitute a toggle, the joint of which, at the pivot 72, is held straight when the vehicle engaging member 73 is in the position shown in Figure 3. When in this position, it will be noted that the vehicle engaging member 73 cannot be fulcrumed to move its upper end toward the bell crank by outward pressure on its lower end, due to the fact that the pivot 72 is on dead center and the toggle joint at this point cannot be broken by any longitudinal stresses upon the links toward the pivot 72. This latch member is equipped with oppositely extending trunnion bearings 74, through which extends a pivot pin 75 secured in the upstanding flanges of the arm 49 to extend transversely thereof. This latch lever 73 is pivotally mounted above a longitudinally extending slot 76 in the free end of the projector arm 49, and the end of the latching lever 73 on the opposite side of the trunnion bearing 74 is adapted to normally depend through the slot 76 to engage the rim of a vehicle 52, as best seen in Figure 3.

The arm of the bell crank 69, to which the links 71 are connected, is provided with an angularly disposed hook or catch 77 having a shoulder 78 adapted to abut the bottom of the projector arm 49 when the latch mechanism is engaged with a vehicle. This catch 77 is adapted to project through an aperture 79 in the projector arm 49 when the latch mechanism is set to engage a vehicle, as best shown in Figures 2 and 3. This catch 77 cooperates with a sliding trip plate 80 having a bevelled nose, as shown, to releasably retain the latching lever 73 substantially perpendicular to the projecting arm to retain the vehicle engaged therewith. This trip slide 80 is slidably mounted longitudinally of the projector arm in a suitable guide 81 formed on the bottom of the projector arm, and is of a width substantially less than that of the slide plate 57 to be slidably mounted in a slot of corresponding width in the slide plate 57. A cleat 82 is secured to the trip slide 80 and a corresponding cleat 83, faced in the opposite direction, is secured to the bottom of slide plate 57. A slide pin 84 is secured to the cleat 83 and is slidable through an aperture in cleat 82 in order to permit the trip slide 80 operating independently of the main slide 54. A compression spring 85 is mounted upon this pin between the two cleats 82 and 83 in order to normally retain the trip slide 80 projected to engage bevelled nose of catch 77 for retaining the latching element 73 in locked position with respect to the vehicle. The compression spring 64 of the latch mechanism also cooperates in retaining the latching mechanism in such position that the latch 73 is normally retained in locked position, shown in Figure 2, in order to retain the vehicle coupled with the revolvable arm 49.

In order that an operator may operate the latching mechanism at any desired moment during revolution of the radiating projector arms 49 to uncouple or release a vehicle from any desired revolving arm, a release mechanism, indicated in its entirety by the numeral 86, is located on floor space or platform beneath the point where the rollers 59 of the respective projector arms 49 pass during their revolution. This release mechanism is broadly in the form of a vertically movable cam plate 87 disposed at an angle of approximately forty five degrees (45°) to the pitch line of the rollers 59, and is adapted to be projected upwardly, at the will of the operator, to be disposed in the path of movement of the roller 59 of each of the projector arms 49 for the purpose of operating the latch mechanism to release the vehicles from these arms at any desired time. This latch release mechanism is shown in detail in Figures 2, 6, 7, 8, and 9. It consists of a bracket or stand 88 bolted by means of the bolts 89 to the top of the platform 16, and is provided with an upstanding guide frame 90 having a vertical guideway 91 for the reception of the vertically slidable cam plate 87; the cam plate being confined in the guide frame by means of a pair of vertically disposed retaining strips 92 bolted to the guide frame by the bolts 93 to overlap the vertical edges of the cam plate 87 and provide vertical guide grooves as shown. At the lower end of the guideway in the guide frame 90 is positioned a stop bar 94 having a cushion on its top to receive the impact from the lower edge of the cam plate when it is permitted to descend, after having been projected upwardly. An upper horizontal stop bar 95 extends from one retaining plate 92 to the other, and is bolted thereto in the path of movement of an abutment 96 secured to the cam plate so as to limit the upward projection of the cam plate 87. Projecting from the outer face of the cam plate at its upper end is a U-shaped bracket 97, through which extends a vertical pivot 98 for pivotally connecting a trip lever 99 thereto. The pivoted end of this trip lever is equipped with a bifurcation in which, and mounted upon the pivot 98, is a torsion spring 100 having one end engaging the bracket 97 and its other end lapped over the trip lever 99 in order to resist outward movement of the trip lever with respect to the cam plate, and to normally retain the trip lever in a plane substantially parallel to the cam plate and beneath a laterally projecting lug 101 at the upper edge of cam plate, as shown more clearly in Figure 6. The outer free end of the trip lever 99 is provided with an inwardly projecting head 102 extending alongside of one vertical edge of the cam plate 87 and having a bevelled surface 103 which projects beyond the surface of the cam plate 87 upon which the rollers 59 travel. This trip lever 99 serves in retaining the cam plate in projected position in the path of movement of the rollers 59 of the revolvable radiating arms 49. The trip lever 99 itself is retained in projected position by means of a vertically slidable bar 104 mounted in a guideway 105 formed on the outer face of the slide frame 90. The lower end of the bar 104 projects through an opening in the base 88 of the guide frame, and through the platform 16, to terminate in a clevis 105′ having a pivot pin 106 extending through the slotted end of arm 107 of bell crank lever 108. The knuckle of this bell crank is pivotally mounted on the underside of the platform, and its arm 109 is pivotally connected at its lower end to a clevis 110 provided on an operating rod 111, which is adapted to be reciprocated horizontally by a manually operable operator's lever 112 fulcrumed between its ends at 113 in a bracket and extending laterally from the edge of the platform 16. Adjacent this point on the platform is provided an operator's platform 114, upon which the operator of the device may stand, to watch the operation of the amusement device, and project the cam plate to release a vehicle from any of the radiating projector arms 49 at will.

In the operation of the device, and assuming that a vehicle 52 is coupled with each of the projector arms 49, the prime mover 42 is operated to cause the head 24 at the center of the platform to revolve, thereby causing the vehicles 52, coupled with the arms 49 to revolve in a circular path upon the platform.

At any desired time, the operator of the amusement device may move the operating lever 112 toward the platform to cause elevation of the bar 104 through the instrumentality of the bell crank 108 and connecting rod 111. The upper end of the bar 104 engages the underside of the trip lever 99, and this lever being connected to the vertically movable cam plate 87; elevation of the bar 104 causes corresponding elevation of the cam plate and trip lever, so that the cam plate is projected into the path of movement of the rollers 59 depending from the radiating projector arms 49. As a projector arm 49 approaching the cam plate revolves, its roller 59 engages the advance end of the cam plate and causes the lock slide 54 to move toward the revolving head, slightly compressing the spring 64, without drawing the connecting links 68 inwardly, due to the lost motion connection between the slide and these links created by the pivot pin 66 operating idly in the slots 67 in the inner ends of the links 68. Simultaneously with this movement of the lock slide 54, the slide plate 57 is carried back with the lock slide, being connected with it. This action moves the cleat 83 against an abutment on the end of pin 84, which, being secured to the cleat 82, effects a yielding retraction of the sliding detent 80 through the spring 85. This action carries the detent 80 from above the hook 77 of the bell crank 69, thereby releasing the latch mechanism, including the bell crank and links 68 and 71, to the further rearward movement of the lock slide 54 under compulsion of the roller 59 thereof being cammed back by the cam plate 87. This further inward movement of the lock slide 54 moves the pivot pin 66 into engagement with the ends of the slot 67 in the links 68, and thereby causes these links to move inwardly toward the revolving head 24. This action swings the bell crank 69 on its fulcrum 70 and moves the connecting links 71 vertically on their pivots 72' until the pivots of the bell crank are moved beyond the dead center, after which the links 71 pull rearwardly on the upper end of the latch lever 73 to swing the same on its fulcrum 75, thereby causing the lower end of this lever to swing outwardly and upwardly out of engagement with the rim of the vehicle 52 to release the same and permit the vehicle to be thrown by centrifugal force outwardly and away from the revolving projector arms 49, so that it may travel under its own momentum over the floor space or platform 16. The cam plate causes the roller 59 to move inwardly toward the revolvable head 24 until the pivots of the bell crank, which connect the links 68 and 71 thereto, are thrown over dead center and the pivot 72' assumes the position shown in Figure 5 to retain the latch lever 73 in a substantially horizontal position within the channel of its respective arm 49, as best seen in Figure 5. At this point in the travel of the roller 59 over the cam plate, the roller strikes the bevelled nose 103 of the trip lever 99 with an impact sufficient to swing the same from beneath the lug 101 of the cam plate, and from above the top of the operating bar 104 which removes the support of the cam plate in its projected position and permits it to drop by gravity in the guide frame 90 out of the path of movement of the cam roller 59 on the next succeeding projector arm to come over the release mechanism. In swinging from above the operating bar 104, the torsion spring 100 is tensioned to move the trip lever 99 back toward the cam plate 87, and when the operator manipulates the lever 112 to reset the device, the bar 104 is lowered sufficiently to permit the trip lever 99 to return alongside the cam plate and beneath the lug 101, as well as above the upper end of the bar 104, so that the cam plate 87 may be again projected into operative position when desired by the operator. Of course, it will be understood that the abutment 96 of the cam plate limits the upward movement thereof when projected into operative position, so that it is prevented from engagement with all parts of the revolving projector arms 49, except their respective cam rollers 59.

To again couple a vehicle with a projector arm 49, the lock slide 54 is pulled toward the outer end of the projector arm by an operator, after the pivot 72' has been raised to break the toggle to throw the bell crank 69 over its dead center and to cause the catch 77 of the bell crank to ride upon the bevelled end of the sliding detent 80 to force the same inwardly against the action of spring 85, until it has moved below the detent plate, at which time the spring 85 returns the detent through its guide 81 to a position above the hooked end of the catch 77. This movement of the catch mechanism causes the latch lever 73 to fulcrum and to swing its lower end over the flange of a vehicle to couple the same thereto. Upon rotation of the revolvable head 24, the projector arms will be revolved, and due to centrifugal forces, the flanges of the vehicles 52 will be held against the depending portions of the latch lever 73, so as to prevent them from becoming accidentally uncoupled, it being obvious that the shoulder 78 of the catch 77 prevents the downward breaking of the joint 72, and upward breaking of this joint is prevented by reason of the pivot pins 72 and 72' being in alignment with the fulcrum 70 of the bell crank, thereby preventing accidental swinging movement of the latch lever 73 which would cause premature uncoupling of the vehicles from the rotary projector head.

Having fully described the construction and operation of the apparatus, it will be understood that various changes in size, shape, and arrangement of parts, may be resorted to without departing from the spirit of the invention or scope of the appended claims.

I claim:—

1. An amusement device comprising a floor space, a revolving head, latch means releasably connecting a vehicle thereto, and manually controlled cam means for actuating said latch means to release the vehicle from said head to be free to move under its own momentum over said floor space.

2. An amusement device comprising a floor space, a revolving head, latch means releasably connecting a vehicle thereto, latch release means projectable into the path of said latch means for operating the latter to release said vehicle from said head, means for retaining the latch release means projected, and means for releasing said latch release means from projected position.

3. An amusement device comprising a revolvable head, a latch mechanism for detachably connecting a vehicle to said head and including a vertically movable vehicle engaging member, means normally acting to retain said member in a vehicle engaging position, detent means cooperating with the latch mechanism to releasably retain the same in vehicle engaging position, said latch mechanism including means for causing release of the detent prior to actuation of the latch mechanism, and means for subsequently actuating the latch mechanism to move said vehicle engaging member.

4. An amusement device comprising a revolving head, a latch mechanism for detachably connecting a vehicle to said head and including a vehicle engaging member, and said latch mechanism also including a fulcrumed member retained on dead center to releasably retain said vehicle engaging member in locked position.

5. An amusement device comprising a revolvable head, a latch mechanism for detachably connecting a vehicle to said head and including a vehicle engaging member and means arranged on dead center to retain said vehicle engaging member in locked position, and means for normally retaining said latch mechanism on dead center to prevent accidental movement of said vehicle engaging member from its locked position.

6. An amusement device comprising a revolvable head, a latch mechanism including a movable vehicle engaging member for detachably connecting a vehicle to said head, said latch mechanism including a bell crank connected to said vehicle engaging member, and means for normally retaining the bell crank in such position that its connection with said vehicle engaging member is on dead center to prevent accidental movement of said vehicle engaging means.

7. An amusement device comprising a revolvable head, a latch mechanism for detachably connecting a vehicle to said head and including a pivoted vehicle engaging member, a toggle mechanism connected to said vehicle engaging member for actuating the same, and means operatively associated with said toggle mechanism for normally restraining breaking of the toggle joint.

8. An amusement device comprising a rotatable head, a latch mechanism for detachably connecting a vehicle to said head and including a fulcrumed vehicle engaging member, a bell crank having its fulcrum arranged in substantially the same plane with the fulcrum of said vehicle engaging member, and a link pivotally connected to said members and having its pivots arranged substantially in alignment with the bell crank fulcrumed when said vehicle engaging member is arranged in locked position.

9. An amusement device comprising a revolvable head, a latch mechanism for detachably connecting a vehicle to said head and including a fulcrumed vehicle engaging member, a bell crank fulcrumed in substantially the same plane with the fulcrum of said vehicle engaging member, a link pivotally connected to said bell crank and vehicle engaging member and constituting a toggle, a second link connected to said bell crank, and means for normally urging said second link to a position causing substantial alignment of the bell crank fulcrum and the pivots connecting said first named link to said bell crank and vehicle engaging member.

10. An amusement device comprising a rotatable head having a radiating vehicle engaging arm, a vehicle engaging lever fulcrumed upon said arm, a bell crank fulcrumed upon said arm, a link pivotally connecting said vehicle engaging lever and one arm of said bell crank, a lock slide mounted upon said arm, a link connecting the other arm of said bell crank to said lock slide, and means normally urging said lock slide to a position causing substantial alignment of the fulcrum of said bell crank and the pivots of said first link connecting the vehicle engaging lever to the bell crank to prevent accidental movement of the vehicle engaging lever in one direction, and an abutment on said bell crank for engagement with said arm to prevent accidental movement of said vehicle engaging lever in the other direction.

11. An amusement device comprising a revolvable head having a radiating arm, a vehicle engaging lever fulcrumed upon said arm, a bell crank fulcrumed upon said arm, a link connecting said bell crank and vehicle engaging lever, and a detent engaging said bell crank to prevent its accidental movement in one direction.

12. An amusement device comprising a revolvable head having a radiating arm, a vehicle engaging member fulcrumed upon said arm, a bell crank fulcrumed upon said arm and having a catch, a link pivotally connected to said bell crank and vehicle engaging member, means for positively moving said bell crank, and a spring projected detent slidably associated with said arm and engaging the catch of said bell crank.

13. An amusement device comprising a revolvable head having a radiating arm, a vehicle engaging lever fulcrumed upon said arm, a bell crank fulcrumed upon said arm and having a catch, a link pivotally connecting said bell crank and vehicle engaging member, a lock slide slidably associated with said arm, a link pivotally connecting said lock slide and bell crank, means for normally urging said lock slide in one direction, and a spring pressed detent slidably associated with said lock slide and adapted to engage the catch of said bell crank.

14. An amusement device comprising a revolvable head, latch means releasably connecting a vehicle thereto, latch release means projectable into the path of said latch means and including a vertically movable latch engaging member, operating means for moving the latch release means into projected position and retaining it in such position, and means releasably connecting said operating means and latch release means operated by said head to effect retraction of said release means from the path of movement of said latch means.

15. An amusement device comprising a revolvable head, latch means releasably connecting a vehicle thereto, a latch release means projectable into the path of said latch means for operating the same and including a vertically movable latch engaging member, a trip lever movably associated with said latch engaging member and adapted to be operated by impact with said latch means, and an elevating mechanism detachably associated with said trip for automatic detachment therefrom upon engagement of said latch means with said trip.

16. An amusement device comprising a revolvable head, latch means releasably connecting a vehicle thereto, latch release means projectable into the path of said latch means and including a vertically movable cam plate, a trip movably associated with said cam plate and having a part engageable with said latch means for moving the trip independently of said cam plate, a vertically movable member releasably engaged with said trip for elevating the said cam plate and being releasable therefrom to permit retraction of said plate, and means situated remotely of said revolvable head for operating said vertically movable member.

17. An amusement device comprising a revolvable head, a vehicle detachably coupled therewith, an operator's station remote from said head, and means controlled from said operator's station for uncoupling the vehicle from said head.

18. An amusement device comprising a revolvable head, a vertical shaft for driving the same, a horizontal drive shaft, gearing between the two shafts, a prime mover shaft in alignment with the drive shaft, a brake drum fixed to the prime mover shaft, and a coupling device fixed to said drive shaft and connected to said brake drum.

19. An amusement device comprising an arena having an exit for the passage of vehicles, a guideway leading from said exit, a rotary projector in the arena to which vehicles are releasably coupled and to which motion is transmitted for propelling the vehicles and projecting them toward said exit, and a vehicle space outside the arena communicating with said guideway and exit.

20. An amusement device comprising an arena having a confining wall and a nonguiding exit therethrough, a guideway leading from the exit for the passage of vehicles, a rotary projector in the arena to which the vehicles are releasably coupled and to which motion is transmitted for propelling the vehicles and projecting them toward said exit, and a vehicle space separated from the arena by the confining wall and extending in a direction toward said guideway to communicate therewith at its juncture with the exit.

21. An amusement device comprising an arena having an exit for the passage of vehicles, an upwardly inclined guideway leading from said exit, a rotary projector in the arena to which vehicles are releasably coupled and to which motion is transmitted for propelling the vehicles and projecting them through said exit into said inclined guideway, a safety vehicle space outside the arena communicating with said guideway, and the floor of said guideway adjacent said vehicle space being inclined in a direction to cause vehicles unable to make the grade of the guideway to enter said vehicle safety space.

22. An amusement device comprising a revoluble arm, and means for detachably connecting a vehicle thereto, including a toggle.

23. An amusement device comprising a revoluble arm, a latch associated therewith for releasably connecting a vehicle thereto and being movable to latched and unlatched positions, and means for locking said latch in either of said positions.

24. An amusement device comprising a revoluble arm, a latch associated therewith for releasably connecting a vehicle thereto and being movable to latched and unlatched positions, and toggle means for locking said latch in either of said positions.

25. An amusement device comprising a revoluble arm, and a latch mechanism associated therewith for releasably connecting a vehicle thereto and being movable to latched and unlatched positions, said mechanism including toggle means for locking said latch in either of said positions.

26. An amusement device comprising a revoluble arm, a latch mechanism associated therewith for releasably connecting a vehicle thereto and being movable to latched and unlatched positions, said mechanism including toggle means for locking said latch in either of said positions, and means set by the unlatching movement to urge said latch mechanism to latching position but restrained therefrom by said toggle means.

27. An amusement device comprising a revoluble arm, a latch mechanism releasably associated with said arm and releasably connecting a vehicle thereto, and being movable to latched and unlatched positions, and means resiliently retaining said latch mechanism in both of its positions.

28. An amusement device comprising a revoluble arm, a latch mechanism associated therewith for releasably connecting a vehicle thereto and being movable to latched and unlatched positions, said mechanism including toggle means for locking said latch in either of said positions, and resilient means for retaining said toggle means in either of its positions to hold the latch mechanism in latched or unlatched position.

29. An amusement device comprising a support, a latch associated therewith, a latch operating mechanism comprising a slide, and a pair of toggle joints connecting the slide and latch and adapted to be alternately arranged in locked position.

30. An amusement device comprising a revoluble arm, a latch associated therewith, a latch operating mechanism comprising a slide, links connecting the slide and latch, one of said links being restrained against movement in one position of said latch, and another of said links being restrained against movement in another position of said latch.

31. An amusement device comprising a revoluble arm, a latch associated therewith, a latch operating mechanism comprising a slide, links connecting the slide and latch, one of said links being restrained against movement in one position of said latch, and another of said links being restrained against movement in either position of said latch.

32. An amusement device comprising a revoluble arm, a latch associated therewith, a latch operating mechanism comprising a slide, a bell crank fulcrumed on said arm, and toggle links connected to the slide, bell crank, and latch.

33. An amusement device comprising a revoluble arm, a latch associated therewith, a latch operating mechanism comprising a slide, a bell crank fulcrumed on said arm, toggle links connected to the slide, bell crank and latch, and spring means normally urging said slide toward said latch.

34. An amusement device comprising a revoluble arm, latch means releasably connecting a vehicle thereto, operating means for the latch means, a detent engageable with the latch means for retaining it in latched position, and said detent being connected to the operating means to be operated prior to actuation of said latch means.

35. An amusement device comprising a floor space, a revoluble arm, means releasably connecting a vehicle thereto, and means associated with the floor space and movable into the path of movement of said first mentioned means to actuate the latter to release said vehicle from said arm.

In testimony whereof I have hereunto set my hand.

JAMES L. MEEHAN.